Dec. 23, 1969    L. L. WONSCH    3,484,979
CHILD'S TOY
Filed May 23, 1966    2 Sheets-Sheet 1
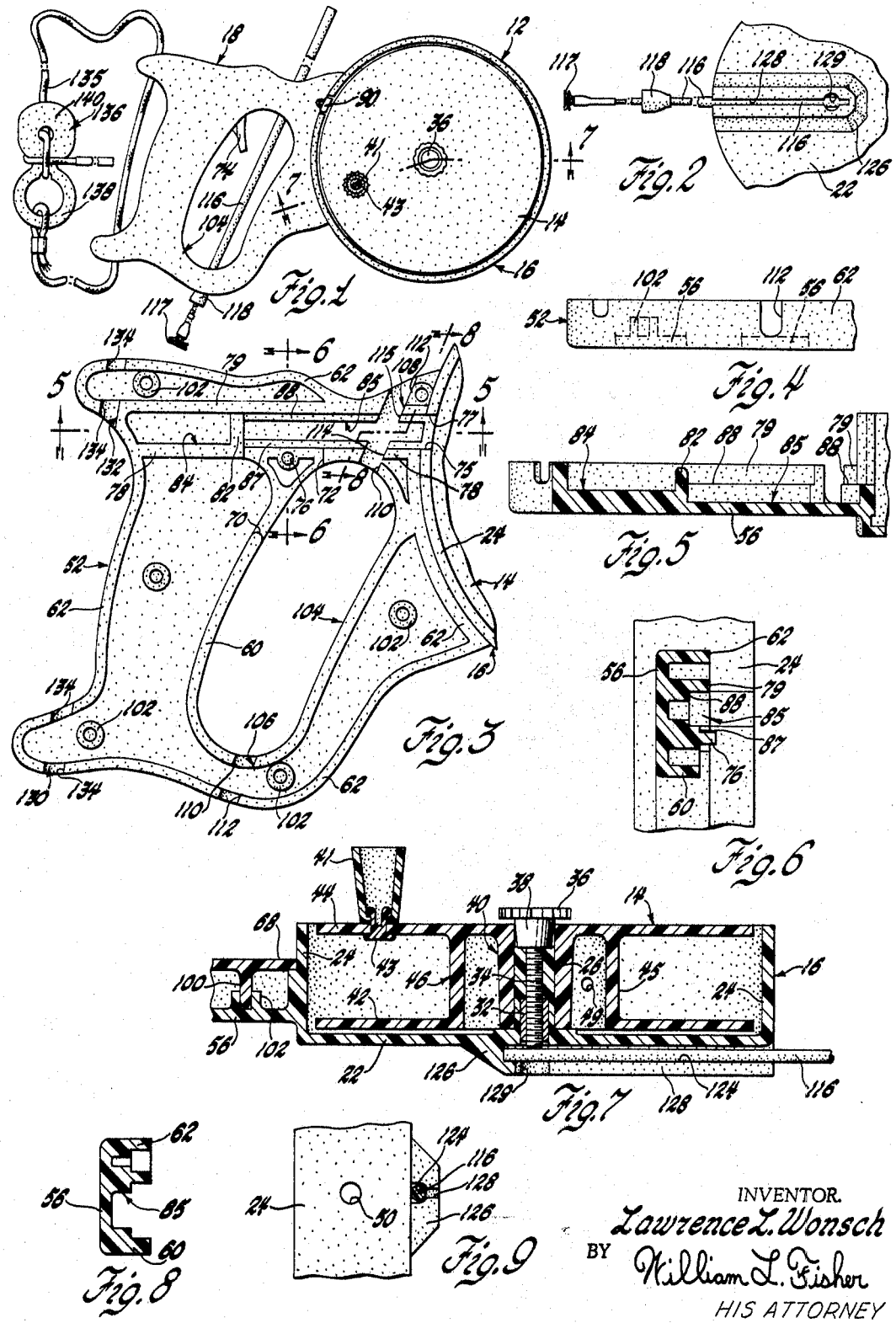
INVENTOR.
Lawrence L. Wonsch
BY William L. Fisher
HIS ATTORNEY

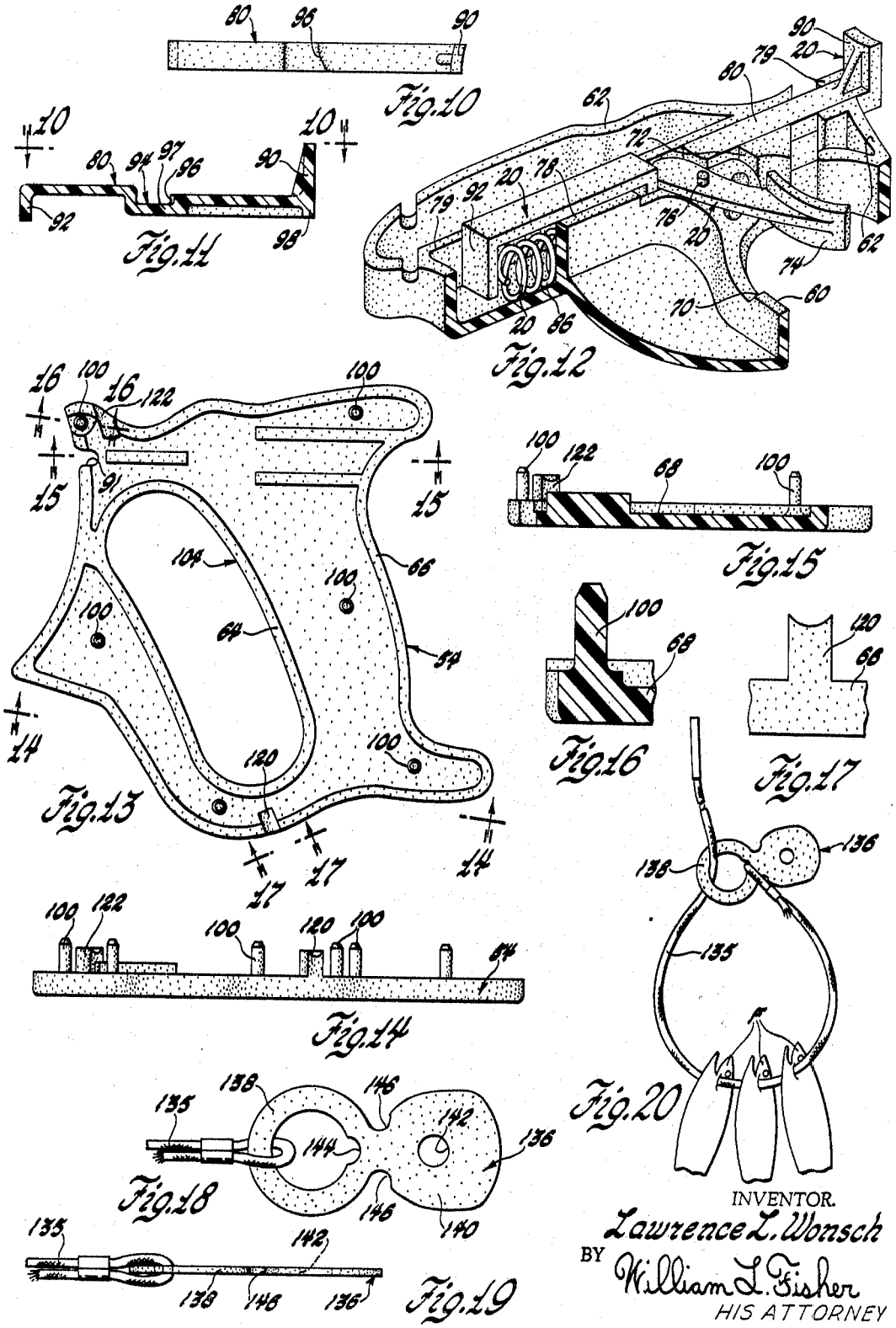

United States Patent Office 3,484,979
Patented Dec. 23, 1969

3,484,979
CHILD'S TOY
Lawrence L. Wonsch, 17720 Common Road,
Roseville, Mich. 48066
Filed May 23, 1966, Ser. No. 552,218
Int. Cl. A01k 89/00, 87/00; A63h 27/04
U.S. Cl. 43—20
5 Claims

ABSTRACT OF THE DISCLOSURE

In a child's toy, a manually operated reel, a housing enclosing the reel and having means rotatably supporting the same, a rotatable handle on the reel eccentrically located in respect thereto, a handle grip for holding the housing, and a flexible rod. Means are provided on the handle grip for holding the rod in a storage position and means are provided on the housing for holding the rod in an operative position to project in front of said housing.

The means for rotatably supporting the reel also holds the rod for axial adjustment in operative position.

My invention relates to children's toys.

Its object is to provide a child's toy which is constructed to make it easy for children to handle string in kite flying, glider whipping, boat sailing, fishing and similar activities which require the handling of string. How my invention attains this object and its advantages will appear from the following description and the accompanying drawings in which:

FIG. 1 is a side elevational view of one embodiment of my invention including a carrying cord and a fishing rod; the latter shown broken and in position for carrying;

FIG. 2 is a fragmentary opposite side elevational view of said embodiment showing the fishing rod broken and in another functional position;

FIG. 3 is a side elevational view of a part of said embodiment;

FIG. 4 is a fragmentary bottom plan view of the structure of FIG. 3;

FIGS. 5–8 are fragmentary sectional views of the structure of FIGS. 1 and 3 taken, respectively, along the lines 5—5 through 8—8 thereof;

FIG. 9 is a fragmentary front elevational view of a part of the structure of FIG. 3;

FIGS. 10 and 11 are side elevational and longitudinal sectional views, respectively, of another part of said embodiment;

FIG. 12 is a perspective view of other parts of said embodiment;

FIGS. 13 and 14 are, respectively, side elevational and bottom plan views of still another part of said embodiment;

FIGS. 15–17 are fragmentary sectional views of the structure of FIG. 13 taken, respectively, along the lines 15—15 through 17—17 thereof;

FIGS. 18 and 19 are side elevational and top plan views of still further parts of said embodiment; and FIG. 20 is a side elevational view of the last mentioned parts in another functional position.

Referring to the drawings in greater detail, 12 designates the child's toy shown therein, which comprises a reel 14 and a housing 16 therefor. The housing 16 has a handle 18 which carries a trigger actuated brake mechanism 20, FIG. 12, for braking the reel 14. In this instance the reel housing 16 is open on one side and closed on the other by a side wall 22 integrally formed with a cylindrical wall 24 which encompasses the periphery of the reel 14 when the latter is supported in the housing 16. The side wall 22 has a hollow shaft portion 26, FIG. 7, formed centrally thereof which has a counterbore formed therein in which a metal tubular member 32 is press fitted. The member 32 is internally threaded and threadably engages a retaining bolt 34 which retains the reel 14 in the housing 16. The bolt 34 has a knurled head 36 and a hub 38 which bears against the outer face of the shaft portion 26 and with the latter serves as an axle for the reel 14. The head 36 is held spaced from the wall 44 by the hub 38. The reel 14 has a hub portion 40 rotatably supported on the axle described with its inner face in engagement with the inner face of the side wall 22 so that an inner radial wall 42 rotates free of such inner face of the side wall 22. The wall 42 is connected via a cylindrical wall 45 to an outer radial wall 44 joined to the hub portion 40 which walls form a string winding chamber 46. The wall 45 is provided with aligned apertures non-diametrically disposed about the hub portion 40 through which one end of a string may be threaded and tied to such hub portion; one such aperture being shown in FIG. 7 and designated 49. The wall 24 is provided with an aperture 50, FIG. 9, through which such string threads in being payed out from or wound upon the reel 14. For cranking the reel 14 a handle 41 is rotatably mounted on the wall 14 and projects outwardly of the outer face thereof. The handle 41 is hollow and its inner end with the internal annular shoulder shown thereon is snapped over the legs of a snap fastener 43 preferably of nylon, the flanged head of which is engaged against the inner face of the wall 44. The fastener 43 is of the type in which the legs press radially outwardly against the inside wall of the handle 41 to retain it freely rotatable but securely on the wall 44.

The handle 18 is made in two parts in the instance which are designated 52, FIG. 3, and 54, FIG. 13. The part 52 is integral with the housing 16 and comprises a side wall 56 which has upstanding inner and outer peripheral walls 60 and 62, respectively, which mate with corresponding walls 64 and 66 which similarly upstand from a side wall 68 of the part 54. The inner peripheral wall 60 is interrupted in height from the point 70, FIGS. 3 and 12, to the point 72 to allow for movement of a trigger 74 which is pivotally supported on a pin 76 upstanding from a longitudinally extending upstanding wall 78 which is joined to the walls 62 and 24. A similar wall 79 is spaced from the wall 78 and between them the wall 24 is interrupted in height between the points 75 and 77 to accommodate a part 80, FIG. 12, of the brake mechanism 20. A transverse wall 82 divides the space between the walls 78 and 79 into two chambers 84 and 85. The chamber 84 houses a spring 86 and the chamber 85 is provided with shoulders 87 and 88 which are integrally formed with the walls 78 and 79, respectively, on the inside thereof. The brake part 80 has an upstanding outer end 90 which, in a brake-on position, frictionally engages the radial wall 44 to brake the reel 14. In the instance the part 80 is normally biased to a brake-off position by the spring 86 which operates against the depending inner end 92 of the part 80 and against the wall 82. The part 80 has a depression 94 between its ends formed inwardly from one side thereof by which the trigger 74 overlays the part 80. The upper end of the trigger 74 operates against a slanted transverse wall 96 at one side of the depression 94. The part 80 has portions 97 and 98 on the opposite side of the depression 94 which are slidably supported on the shoulders 87 and 88. The part 80 is actuated to a brake-on position by pulling the lower or finger portion of the trigger 74. The brake mechanism 20 is assembled in the part 52 and the part 54 is then fitted to the part 52 by insertion of the plurality of pins 100 on the part 54 into corresponding sockets 102 on the part 52 and the pins and sockets are preferably cemented together. The outer end 90 of the brake part 80 is aligned with the wall 24 when the parts 52 and 54 are assembled with the brake mechanism 20 in place. The part 54 is slotted, as at 91, to accommodate the rib formed in the instance on the outer end 90. When assembled the parts 52 and 54 form via the mating walls 60 and 64 a finger opening 104 by which the handle 18 may be gripped and the trigger 74 pulled. At the top and bottom of the finger opening 104 through-apertures 106 and 108 are formed in the parts 52 by aligned open slots 110, 112, 114 and 115 in the walls 60, 62, 78 and 79, respectively. Bosses 120 and 122 upstand from the side wall 68 of the part 54 and project into the apertures 106 and 108, respectively, to close them off. A tapered flexible rod 116 having a conventional eye 117 on its outer end is carried in stored position in the handle 18 by extending through the apertures 106 and 108. The rod 116 is loose in the aperture 108 but carries a tapered plug 118 of soft rubber which locks in the aperture 106 by frictional engagement therewith, preferably via compression of the plug 118. The rod 116 has an operative position for fishing and glider whipping in which it projects forwardly of the reel housing 16. In this position the inner end of the rod 116 is retained in an axial aperture 124, FIG. 7, in an embossment 126, FIG. 2, formed on the outer face of the side wall 22 and is locked in position in said aperture 124 by pressure applied to such inner end of the rod 116 by the inner end of the retaining bolt 34. The rotational position of the rod 116 in the aperture 124 can be adjusted to align the eye 117 with the opening 50 as desired. The embossment 126 has an axial slot 128 through its outer wall to insure that the aperture 124 is always clear of debris. Such outer wall of the embossment 126 has an aperture 129 formed therein which intersects the slot 128 through which aperture 129 the member 32 is inserted to be press fitted in the counterbore in the shaft portion 26.

At the top and bottom of the part 52 rearwardly of the finger opening 104 through apertures 130 and 132, FIG. 3, are formed by aligned open slots 134 in the wall 62. A cord 135, preferably of braided nylon, is threaded through the apertures 130 and 132 and carries a buckle 136 at one end. The buckle 136 has a closed loop 138 to which one end of the cord 135 is affixed as shown and a body 140 about which the other end of the cord 135 may be wrapped and hitched as shown. The body 140, FIG. 18, has an aperture 142 and an aligned open slot 144 in which one run of the stringer is held and a pair of transverse open slots 146 in one of which another run of the stringer is held. The cord 135 and the buckle 136 serve as a belt for carrying the toy 12 and in this connection it should be noted that by threading the free end of the cord first through the closed loop 138 the slot 144 serves as a holding means for temporarily holding the cord 135 and the buckle 136 is fixed relation to each other while the cord 135 is hitched to the buckle 136. The cord 135 and the buckle 136 also serve as a fish stringer as shown in FIG. 20 in which case fish, as indicated at F, are strung onto the free end of the cord and pushed toward the buckle 136. Thereafter the free end of the cord 135 is threaded through the loop 138 to capture the strung fish F and carry them via the free end of the cord 135.

The toy 12 is carried around the waist of the user by the cord 135 which is tied, as described, by means of the buckle 136. In use of the toy 12 string is threaded through the aperture 50 from the outside to the inside of the reel housing 16 and then threaded through the aligned apertures 49 and tied to the hub portion 40. The reel 14 is cranked by the handle 41 so that it rotates upon the axle described to wind the string up within or to pay it off from the string chamber 46. The free end of the string may be tied to a kite or to a boat for flying or sailing the same, respectively. The inner end of the rod 116 may be inserted into the aperture 124 and locked in position therein and the free end of the string may be threaded through the eye 117 and tied to a glider for wipping it about in a circle overhead or tied to a sinker and hook for fishing.

Reference is made to applicant's copending design patent application S.N. Des. 80,841 filed July 13, 1964 now U.S. patent Des. 204,893 issued May 24, 1966.

It will thus be seen that there has been provided by the present invention a child's toy in which the object hereinabove set forth has been successfully achieved. While a preferred embodiment of the invention has been shown and described it is to be understood that variations and changes may be resorted to without departing from the spirit of the invention.

What is claimed is:

1. In a child's toy, a manually operated reel, a housing enclosing the reel and rotatably supporting the same, a rotatable handle on the reel eccentrically located in respect thereto, the reel insertable into and removable from said housing from one side thereof, a handle grip for holding the housing, a flexible rod, means on the handle grip for holding the rod in a storage position, and means on the housing for holding the rod in an operative position to project in front of said housing.

2. In a child's toy as claimed in claim 1, the means on the housing holding the rod being adjustable to adjust the axial rotational position of the rod in respect to the housing.

3. In a child's toy as claimed in claim 2, an eye on the end of the rod, the other end of the rod secured to the housing, the housing having a front wall and an aperture therein with which said eye can be aligned via said adjustable holding means.

4. In a child's toy a manually operated reel, a housing enclosing the reel and rotatably supporting the same, a rotatable handle on the real eccentrically located in respect thereto, a handle grip for holding the housing, a flexible rod, means on the housing for holding the rod to project in front of the same, said means holding the rod being adjustable to adjust the axial rotational position of the rod in respect to the housing, and said means holding the rod also holding the reel to the housing.

5. In a child's toy as claimed in claim 4, said holding means comprising a bolt threadably engaged with the housing for holding the reel thereto and also locking the reel in position in respect to the housing.

References Cited

UNITED STATES PATENTS

| 2,333,632 | 11/1943 | Benson | 43—20 |
| 2,402,882 | 6/1946 | Garr | 43—20 |
| 2,655,756 | 10/1953 | Polis | 43—20 |
| 2,720,365 | 10/1955 | Kovalchik et al. | 43—20 X |
| 2,753,131 | 7/1956 | Erdman. | |
| 2,783,952 | 3/1957 | Clay | 43—20 X |

FOREIGN PATENTS 878,579  6/1953  Germany.

SAMUEL KOREN, Primary Examiner

U.S. Cl. X.R.

43—21.2, 22, 23, 25.2; 46—77; 224—7; 242—84.1, 96